US012716439B2

(12) United States Patent
Batash

(10) Patent No.: US 12,716,439 B2
(45) Date of Patent: Aug. 25, 2026

(54) HANDLE EXTENSION TO AID THREADING A BUTTON THROUGH A HOLE

(71) Applicant: CLOOZZ LTD, Tel Aviv (IL)

(72) Inventor: Itzchak Batash, Bat Yam (IL)

( * ) Notice: Subject to any disclaimer, the term of this patent is extended or adjusted under 35 U.S.C. 154(b) by 323 days.

(21) Appl. No.: 18/290,824

(22) PCT Filed: Jul. 20, 2022

(86) PCT No.: PCT/IL2022/050781
§ 371 (c)(1),
(2) Date: Jan. 22, 2024

(87) PCT Pub. No.: WO2023/021501
PCT Pub. Date: Feb. 23, 2023

(65) Prior Publication Data

US 2024/0328444 A1 Oct. 3, 2024

Related U.S. Application Data

(60) Provisional application No. 63/233,278, filed on Aug. 15, 2021.

(51) Int. Cl.
*F16B 2/22* (2006.01)
*G02C 11/02* (2006.01)

(52) U.S. Cl.
CPC ................ *F16B 2/22* (2013.01); *G02C 11/02* (2013.01)

(58) Field of Classification Search
CPC .................................. F16B 2/22; G02C 11/02
See application file for complete search history.

(56) References Cited

U.S. PATENT DOCUMENTS

| | | | | |
|---|---|---|---|---|
| 4,471,509 A * | 9/1984 | Marks | .................... | G02C 11/02 24/299 |
| 2007/0006502 A1* | 1/2007 | Schmelzer | ............... | A44B 1/32 40/636 |

FOREIGN PATENT DOCUMENTS

| | | | |
|---|---|---|---|
| CA | 3227775 | A1 | 2/2023 |
| CN | 117795210 | A | 3/2024 |
| EP | 2843247 | A1 | 3/2015 |
| IL | 250880 | A | 10/2017 |
| IL | 310320 | | 3/2024 |
| JP | 11236908 | | 8/1999 |
| JP | 2024531062 | A | 8/2024 |
| MX | 2024001973 | | 3/2024 |

* cited by examiner

*Primary Examiner* — David M Upchurch

(57) ABSTRACT

The present invention relates to a system and method for attaching two objects using a button type connecter through a hole and/or a loop. The system comprises a handle attached to the button which is threaded through the hole and/or loop, thereby dragging the button through the hole and/or loop. Optionally, the handle is removable.

12 Claims, 10 Drawing Sheets

101
102
104
106
108
116
110
100
112
114
103

106
104
108
101
102
116
110
103
112
114

108
104
102
101
106
112
114
103
110

106
108
102
104
102
112
114
103
110
101

102
114
102
110
108
114
104
103
112

102
108
112
102
103
110
103

110
112
102
102

118
102
114

102
100
118

118
102

108
112
S
103
114
110
108
112
M
114
103
110
108
112
L
114
103
110

202
Select appropriately sized band
204
Thread handle through mount opening
206
Pull handle until button passes through mount opening
208
Break off handle
210
Twist band 90º with respect to ornament
212
Attach band connected to ornament to desired object

HANDLE EXTENSION TO AID THREADING A BUTTON THROUGH A HOLE

RELATED APPLICATION/S

This application claims the benefit of priority under 35 USC § 119(e) of U.S. Provisional Patent Application No. 63/233,278 filed 15 Aug. 2021, the contents of which are incorporated herein by reference in their entirety.

FIELD AND BACKGROUND OF THE INVENTION

The present invention, in some embodiments thereof, relates to a system and method for attaching two objects and, more particularly, but not exclusively, a method for inserting a button type connecter through a hole and/or a loop.

Button type connectors are often problematic to use when connecting two objects together since a certain amount of force may be required to push a button through a corresponding mount. This may be difficult, particularly when delicate or fragile items are being connected which may be damaged by excessive force.

Therefore, there is a need for a system for attaching two objects using a button type connecter through a hole and/or a loop.

SUMMARY OF THE INVENTION

According to an aspect of some embodiments of the invention, there is provided a system for attaching two objects including: a first object including a button type connecter; a handle attached to a button type connector; and a second object including a mount for the button type connector, the mount having an opening that facilitating inserting connecting the mount to the button type connector by inserting the button type connector therethrough and inhibiting disconnection between the button type connector and the mount by inhibiting the button type connector from passing back out therethrough and wherein the handle is configured for inserting the button type connector through the opening by pulling the handle.

According to some embodiments of the invention, the handle is thinner than the button type connector and therefore passes more easily through the opening than the button type connector.

According to some embodiments of the invention, the system further includes: a detachable connector between the button type connector and the handle.

According to some embodiments of the invention, the detachable connecter is a tear connector.

According to some embodiments of the invention, the tear connector includes a narrow section.

According to some embodiments of the invention, the tear connector includes a reduced strength section.

According to some embodiments of the invention, the system further includes: a biasing mechanism for biasing the button type connector to a preferred rotational orientation within the mount.

According to some embodiments of the invention, the biasing mechanism includes a matching surface between the first object and the second object.

According to some embodiments of the invention, the matching surface includes a flat surface.

According to some embodiments of the invention, the handle is removable or detachable from the button.

According to some embodiments of the invention, the handle is attached to the button type connector by a reduced radius tear connector.

According to some embodiments of the invention, the handle has a length between about 10 to 50 mm long.

According to some embodiments of the invention, the first object includes a band that is selected from a variety of sizes.

According to some embodiments of the invention, the first object includes a band having a diameter of between about 3 to 8 mm wide, between about 4 to 9 mm wide, or between about 5 to 12 mm wide.

According to some embodiments of the invention, the first object is made from a flexible, semi-flexible or elastic material.

According to some embodiments of the invention, the second object is made from a rigid, flexible, semi-flexible or elastic material.

According to some embodiments of the invention, the first object has at least one flat side.

According to some embodiments of the invention, the button has at least one flat side.

According to some embodiments of the invention, the first object is rotated with respect to the second object to a preferred orientation.

According to some embodiments of the invention, a third object is connected to the system through the first object.

According to an aspect of some embodiments of the invention, there is provided a method for attaching a first object to a second object including: threading a handle connected to a button type connecter on the first object of the first object and the second object through a mount opening on a second object of the first object and the second object; pulling the handle to draw the button through the mount opening.

According to some embodiments of the invention, the method further includes: breaking detachable handle off from the button after the threading.

According to some embodiments of the invention, the method further includes rotating the button within the mount to orient the second object to a preferred orientation with the first object.

According to some embodiments of the invention, the method further includes: locking orientation between the first and second objects in the preferred orientation.

According to some embodiments of the invention, the method further includes elastically deforming at least one of the button and the mount in order to pass the button through the mount opening.

According to some embodiments of the invention, the method further includes returning at last one of the button and the mount to its original shape once the button has passed through the mount opening.

According to some embodiments of the invention, the breaking off of the detachable handle is performed by pulling, twisting, tearing or cutting the handle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a block diagram illustrating a connection system in accordance with an embodiment of the current invention.

DESCRIPTION OF SPECIFIC EMBODIMENTS OF THE INVENTION

Figures 1A, 1B, 1C, 1D:
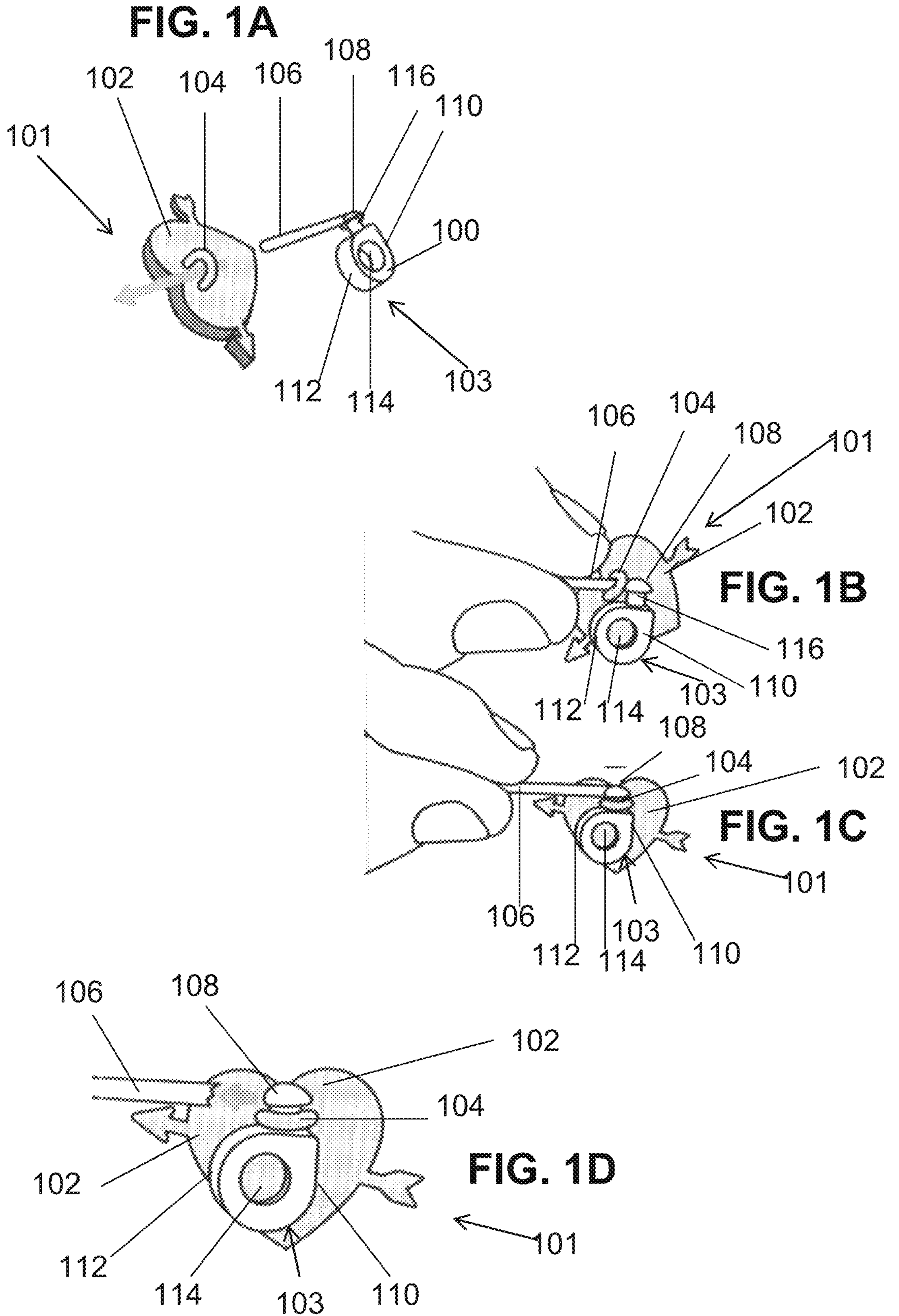
FIGS. 1A-1K are illustrative diagrams illustrating connecting a button in accordance with an embodiment of the current invention.

The present invention, in some embodiments thereof, relates to a system and method for attaching two objects and, more particularly, but not exclusively, a system and/or method for inserting a button shaped connecter through a hole and/or a loop. Optionally, the button and/or loop may be elastic.

Overview

An aspect of some embodiments of the current invention relates to a temporary extension (e.g., a handle) to a button type connector that can easily be threaded through a mount (e.g., button hole (e.g., a hole in an object and/or a loop). The mount is optionally attached to an object. The handle is optionally used to pull the button through the hole. In some embodiments, the handle is easily separated from the button (e.g., after pulling the button through the mount). Optionally, the button and/or the extension may be molded as one unit. In some embodiments, the button and/or the loop and/or the hole may be elastic. Optionally, the button may be used as a method for attaching two objects.

An aspect of some embodiments of the invention relates to a system and/or method for inserting and/or attaching a button type connecter through a mount (e.g., a loop and/or a button hole). For example, the button type connector may be connected to a handle that may be small enough and/or shaped in a way that it may be easily inserted and/or threaded into the hole or loop. The handle may optionally be removeable (e.g., the handle may be attached to the button with a reduced radius and/or tear connector). Optionally, a user may insert and/or thread the handle through and/or into a mount (e.g., a button hole or loop). Optionally, a user may then pull the handle until the button is pulled through the mount. Optionally, the handle may then be broken off and/or detached (e.g., by pulling hard and/or twisting).

In some embodiments, the button type connector may be designed such that once inserted into the mount it may then be held securely in place. For example, the connector may be mushroom shaped (e.g., with a large button head connected by a thin step (such as a neck) to the object that is to be attached to the mount). Optionally, once the mushroom is pushed through the mount opening then the mount may be securely fitted in the crevice underneath the button connector and/or around the stem. Additionally, and/or alternatively the object may have a broad mass underneath the crevice thus causing the mount to be secured by preventing it from moving up or down. Optionally, this may result in the mount (and the object connected to the mount) being connected (e.g., connected firmly) with the object attached to the button. Optionally, this may help fit a button more easily and/or more efficiently into a mount and/or a allow for use of a mount of smaller size, which may result in a more secure connection. Optionally, one or both of the objects, the mount and/or stem may be shaped to fit in a particular orientation. For example, the button and/or stem and first object associated with the button may have a flat side that fits to a flat side of a second object associated with the mount when the two objects are aligned properly.

In some embodiments, the button of a first object may be inserted into and/or attached to a mount connected to a second object. Optionally, an object may be connected to a mount (e.g., a semi-circular shaped mount which may be connected to the object at two points). An additional object and/or an additional part of the original object may be fitted and/or attached with a singular, and/or multiple, button type connector(s). For example, the mount may be associated to an ornament and/or the button may be associated to an attaching means (e.g., for attaching the ornament to another object). For example, the button may be associated with a loop that may be attached to an eyeglass temple and/or the mount may be associated with an ornament (for example the mount may be a loop attached to the ornament e.g., a horseshoe loop attached at two ends to the ornament).

For example, one object may be a band, which may fit most types of eyeglass frames. Optionally, the band may come in multiple (e.g., 3, 4, etc.) sizes, and/or different (e.g., 4 standard) colors. Optionally, the ornament may be decorative and/or functional or both (e.g., a jewel, logo, emblem, camera, etc.).

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIGS. 1A-1K are illustrative diagrams illustrating an attaching an object in accordance with an embodiment of the current invention. An embodiment of the current invention may include an object associated with a mount 104 ornament and/or jewel and/or emblem which may, for example, be designed with a mount 104. For example, the mount 104 may be semi-circular (e.g., connecting to the backside of the ornament). The embodiment may also include a band 103 (and/or another object) which may be a fitted with a button type connector and/or a breakable and/or detachable handle.

For example, a band 103 may comprise a handle 106 adjacent to a button 108, and an opening 114. The handle 106 may be threaded and/or inserted into the mount hole 104 e.g., on the back side 102 of an ornament, e.g., as illustrated in FIG. 1A. Then the user may pull the handle 106 bringing the button 108 into contact with the mount hole 104, e.g., as illustrated in FIG. 1B. The user may then pull the button 108 through the mount hole 104 using the handle 106, e.g., as illustrated in FIG. 1C. Optionally, a user may then break off the handle 106 from the button 108. For example, the user may then twist and/or pull the handle 106 which may break it off from the button 108, e.g., as illustrated in FIG. 1D. Optionally, the handle 106 may be attached to the edge of the button 108 that is supposed to be pulled first through the mount opening 104, for example, a circumferential edge of the button. Optionally, the handle 106 may be attached to the neck 116 below the button 108 on the side that is supposed to be pulled first through the mount opening 104.

Figures 1E, 1F, 1G:
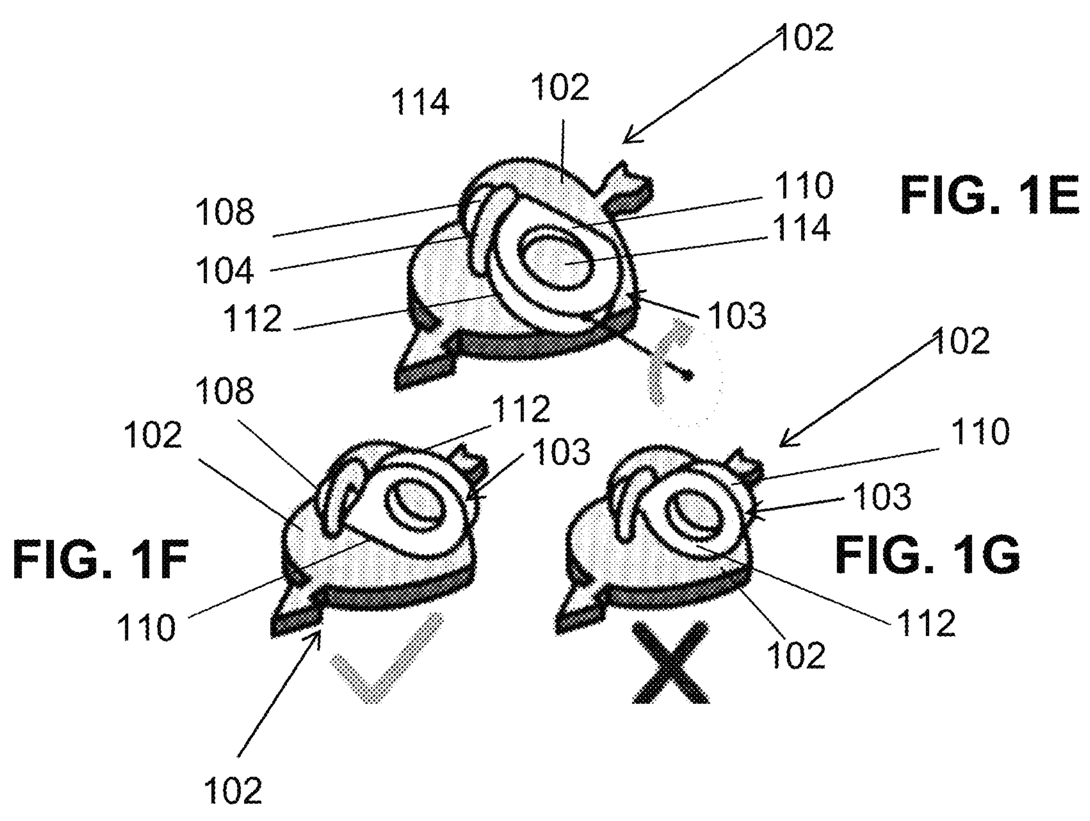

In some embodiments, an object 100 associated with the button 108 (e.g., a band 103) may have a preferred direction. For example, the button 108 may rotate in the mount opening 104. Optionally, the geometry of the mount 104 opening, the button 108, the neck 116, the object 101 to which the mount 104 is attached, and/or the object 100 to which the button 108 is attached may bias and/or lock the button 108 and/or object 100 attached to the button in the preferred orientation with respect to the mount 104 and/or the object 101 associated with the mount 104. For example, the object 100 associated with the button 108 may include a curved side 112 and/or a flat side 110 and/or multiple flat sides. Optionally, the object 100 associated with the button 108 may include a band 103. For example, the band may be rotated horizontally such that a flat back wall 102 of the ornament will be adjacent to the flat wall 110 of the band causing them to secure together, when the band 103 is rotated to a preferred orientation (e.g., by 90°) between the attached objects, e.g., as illustrated in FIG. 1E. That is the flat back wall 102 of the ornament and the flat side wall 110 of the band 103 are in contact, and the curved/rounded side 112 of the band 103 is pointing away from the flat back wall 102 of the ornament, e.g., as illustrated in FIG. 1F.

Figures 1H, 1I, 1J, 1K:
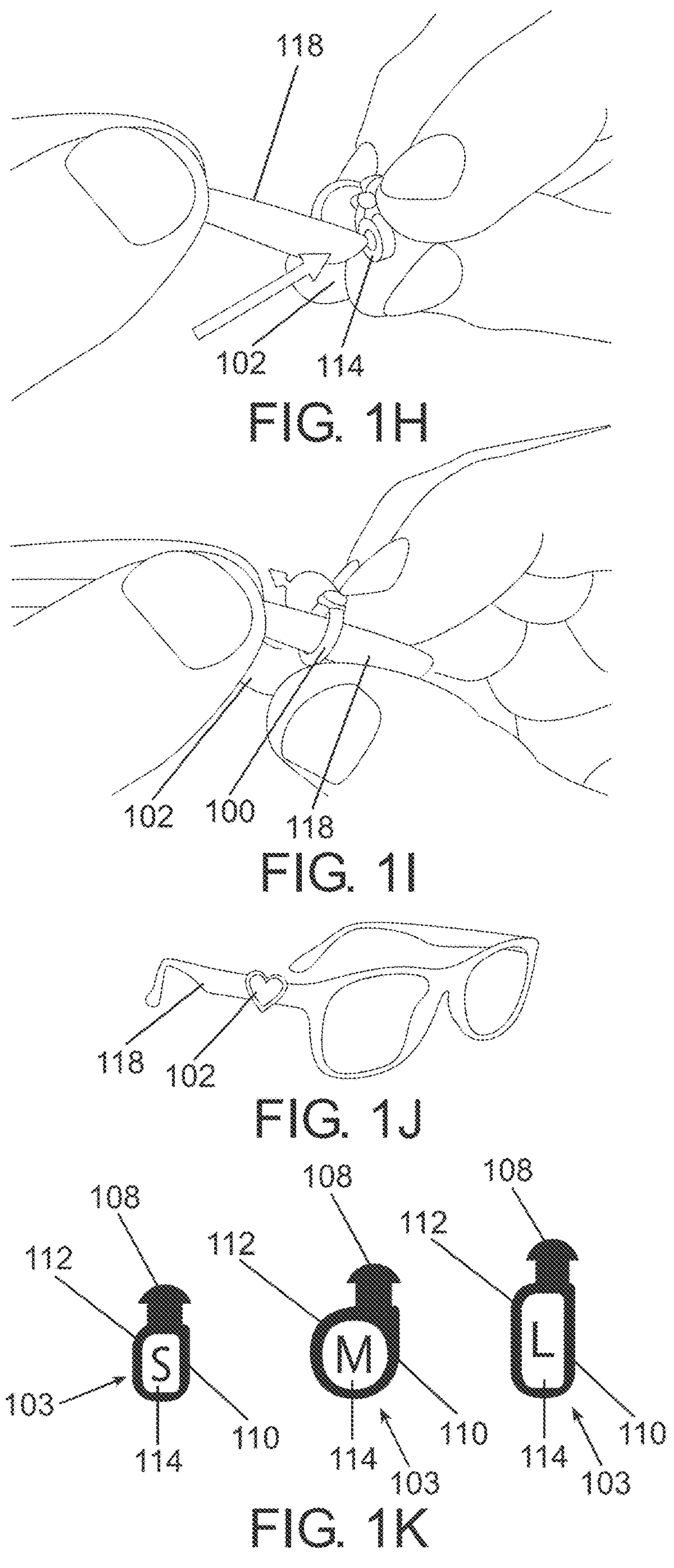

FIG. 1G illustrates incorrect alignment of the flat side 110 and curved/rounded side 112 of the band 103 with respect to the flat back wall 102 of the ornament. Optionally, the ornament may have a vertical indent in its back wall 102 that may better grip the band 103 when it is adjacent to the back wall 102 of the ornament. The band 103 may then be fitted to an object such as a pen, and/or temples of eyeglasses, etc. For example, the temple 118 of eyeglasses may be threaded through the opening 114 of the band 103 now attached to the back wall 102 of an ornament, e.g., as illustrated in FIG. 1H. The ornament may then be slid along the temple 118 to the desired position, e.g., as illustrated in FIGS. 1I and/or 1J. Optionally, the product may have multiple sizes and/or shapes of bands which may be predesigned to fit onto various objects and/or eyeglasses, such as small, medium and large, e.g., as illustrated in FIG. 1K. For example, a product may come with bands suitable for glasses/other objects with a diameter of between about 3 to 8 mm wide, and/or between about 4 to 9 mm wide, and/or between about 5 to 12 mm wide, and/or between about 12 to 30 mm wide.

In some embodiments, the bands may be of various colors. Optionally, multiple colors of bands may come in each product and/or a singular color may come with a product. Optionally, the ornament may come in multiple colors, shapes, sizes, decorations, e.g., may contain a glass jewel, etc.

In some embodiments, other objects may be fitted with a button connector. For example, office accessories such as pens, drink identifiers, toothbrushes, keys, umbrellas, eyeglasses, sunglasses, phone charger wires, etc., and/or jewelry such as bracelets and/or necklaces, etc., and/or clothing, and/or other. For example, a bracelet may be made to close using an embodiment of the current invention.

Figure 2:
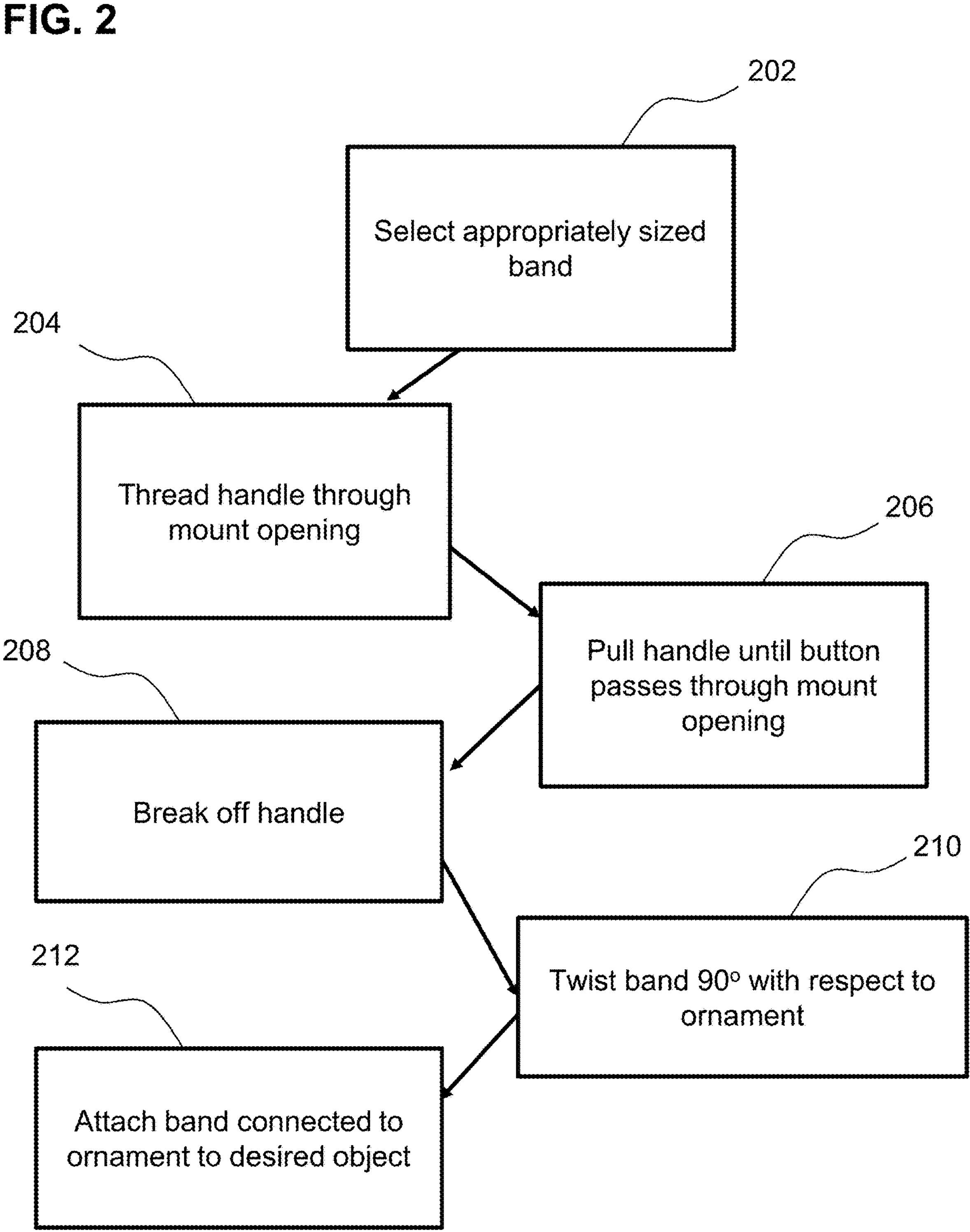
FIG. 2 is a flow chart illustrating a method of connecting a button in accordance with an embodiment of the current invention.

FIG. 2 is a flow chart illustrating an embodiment of the current invention. A user may want to attach an ornament and/or emblem and/or a jewelry to another object. For example, a user may select 202 a first object with an appropriately sized band with a button type connector and/or removable handle attached to it. The user may thread 204 the handle through a mount opening of a second object, such as an ornament. The user may then pull 206 the handle until the button passes through the opening of the mount. Then, the user may pull and/or twist the handle until it breaks 208 off. Optionally, the band/other object with the button may have a flat side and/or multiple flat sides such that the band may be rotated horizontally 210 such that the back wall of the ornament will be adjacent to the flat wall of the band causing them to secure together; and/or preserve a preferred orientation between the attached objects. The user may then attach the band connected to the ornament to a third object, e.g., by threading the third object through the band of the first object attached to the second object by the button type connector.

Additionally, and/or alternatively, the ornament and/or the band may have other features that lock a particular orientation. Alternatively, and/or additionally, the rotating 210 to the preferred orientation may include twisting between about 10 to 30 degrees, and/or between about 30 to 60 degrees, and/or between about 60 to 90 degrees. Alternatively, and/or additionally, the button may be inserted into the mount already in a preferred orientation (e.g., the band may not be rotated after insertion of the button).

In some embodiments, the handle may be separated 208 from the band before the band is rotated 210 to the preferred orientation. Alternatively, and/or additionally, the handle may be broken off 208 after the band is rotated 210 to the preferred orientation. The user may then attach the band to another object thus affixing the ornament onto the desired object. For example, the band connected to an ornament may then be fitted and/or attached 212 to an object such as a pen, and/or temples of eyeglasses.

Figure 3:
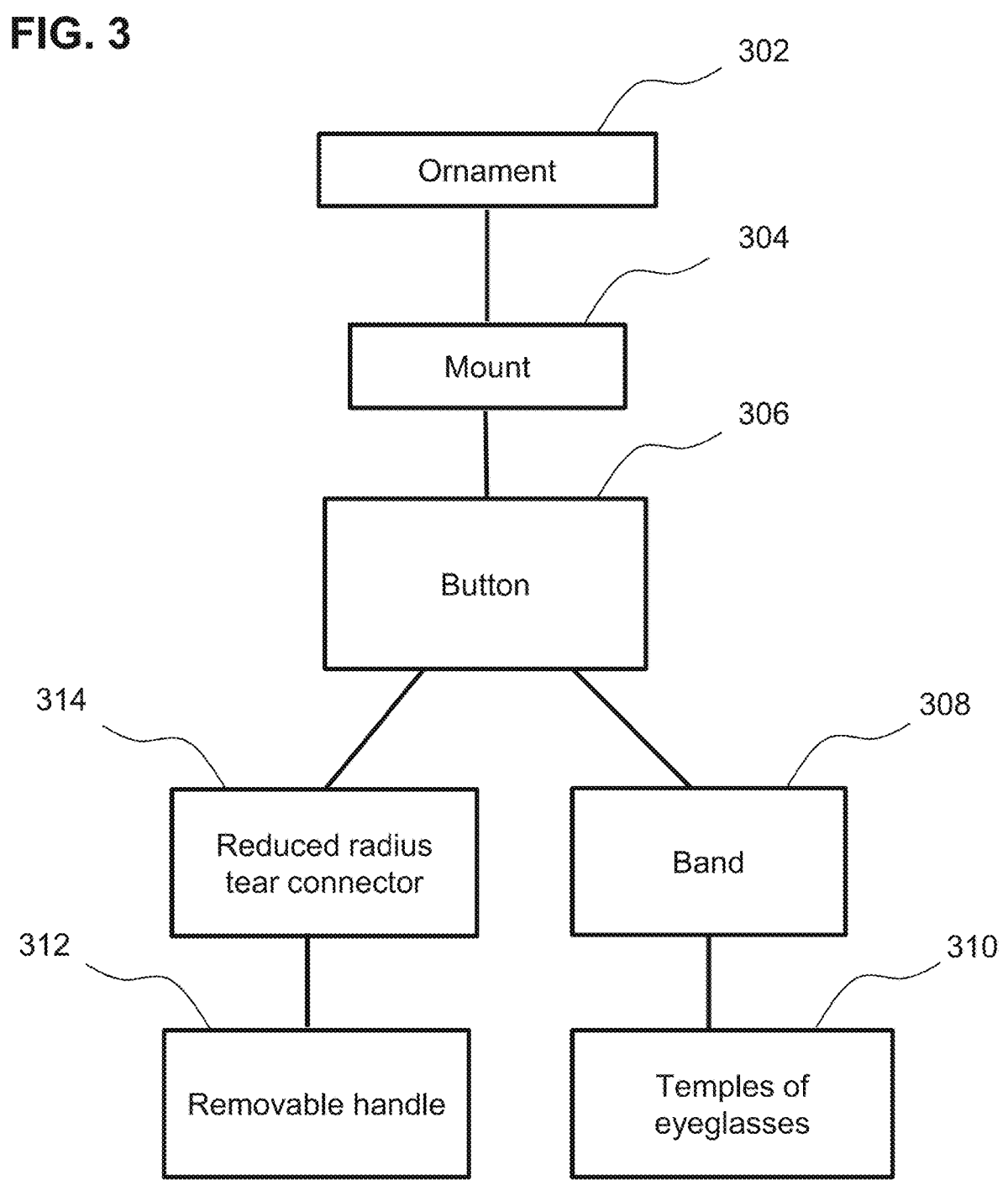

FIG. 3 is a block diagram illustrating an embodiment in accordance with the current invention. For example, an optional embodiment of the invention may comprise a first object and a second object. The first object may comprise, for example, an ornament 302 connected to a mount 304. The second object may comprise, for example, a band 308. Optionally, a button 306 attached to a removable handle 312. For example, the handle 312 may be attached to the button via a reduced radius and/or tear connector 314. The ornament 302 may be fitted to the band 308 by threading the handle 312 and/or the button 306 through the mount 304, and then optionally, removing the handle 312 by breaking the connector 314, and/or then fitting band 308 to a third object 310, e.g., the temple of eyeglasses, etc.

Figure 4A:
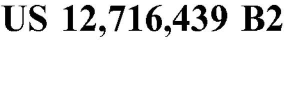
FIGS. 4A-4C are perspective views of a loop and a button and a connector in accordance with an embodiment of the current invention.
Figure 4A:
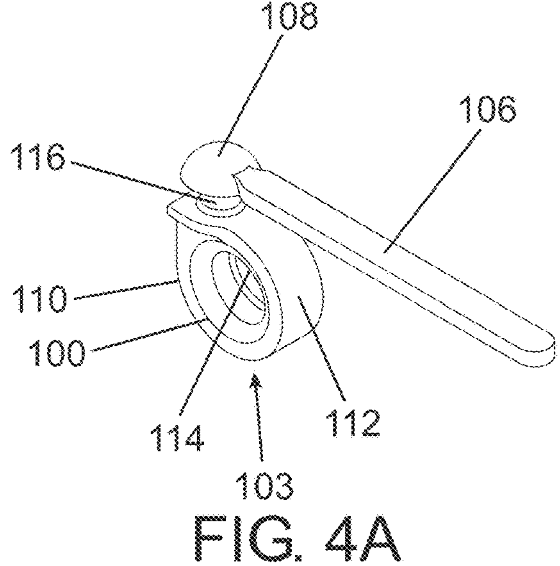
Figure 4B:
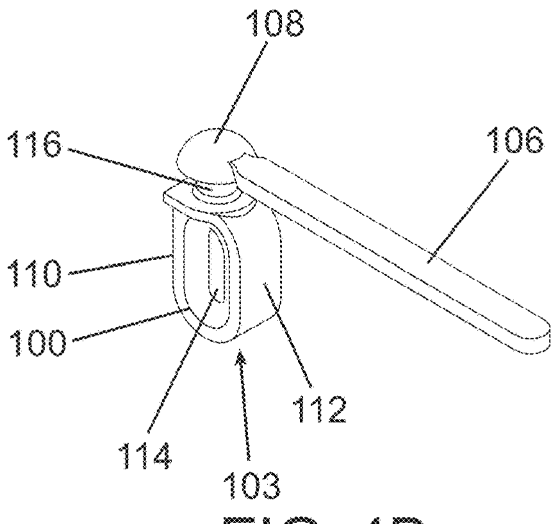
Figure 4C:
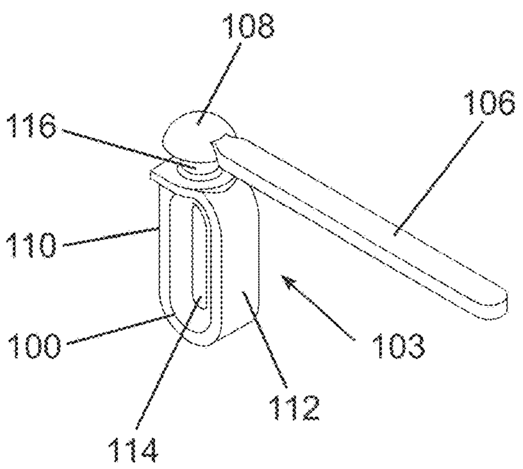

FIGS. 4A-4C are perspective views of schematic diagrams of some embodiments in accordance with the current invention. In some embodiments, an object (for example band 103) may be configured to bias a button connector to a particular rotational position in a mount. For example, in an embodiment a band 103 having a flat side 110, a rounded side 112 and an opening 114 may be attached to a neck 116 with a button 108 shaped connector at one end (e.g., a top end). The button 108 may be connected to a handle 106. The band 103 may be of various shapes. For example, the shapes may be predesigned to fit onto various third objects. Optionally, the handle 106 may be removable. Alternatively or additionally, another part of the system may bias the rotational angle of the button. For example, the button and/or the neck of the button may have a flat side.

In some embodiments, the button connector may be attached to a loop that fits to an eyeglass temple. The loop for example, may be round and/or elongated. For example, the long dimension of the opening 114 in an unstressed state may range between 0.5 to 1 mm and/or between 1 to 4 mm and/or between 4 to 10 mm. For example, the ratio of lengths of the long to short dimension of the loop may range between 1 to 1 to 1.1 to 1 and/or between 1.1 to 1 to 1.5 to 1 and/or between 1.5 to 1 to 3 to 1 and/or between 3 to 1. Optionally, the loop may be elastic and/or may elastically stretch to between 1.1 to 1.5 times its unstressed size and/or between 1.5 to 3 times its unstressed size and/or between 3 to 5 times is instressed size.

Figures 5A, 5B:
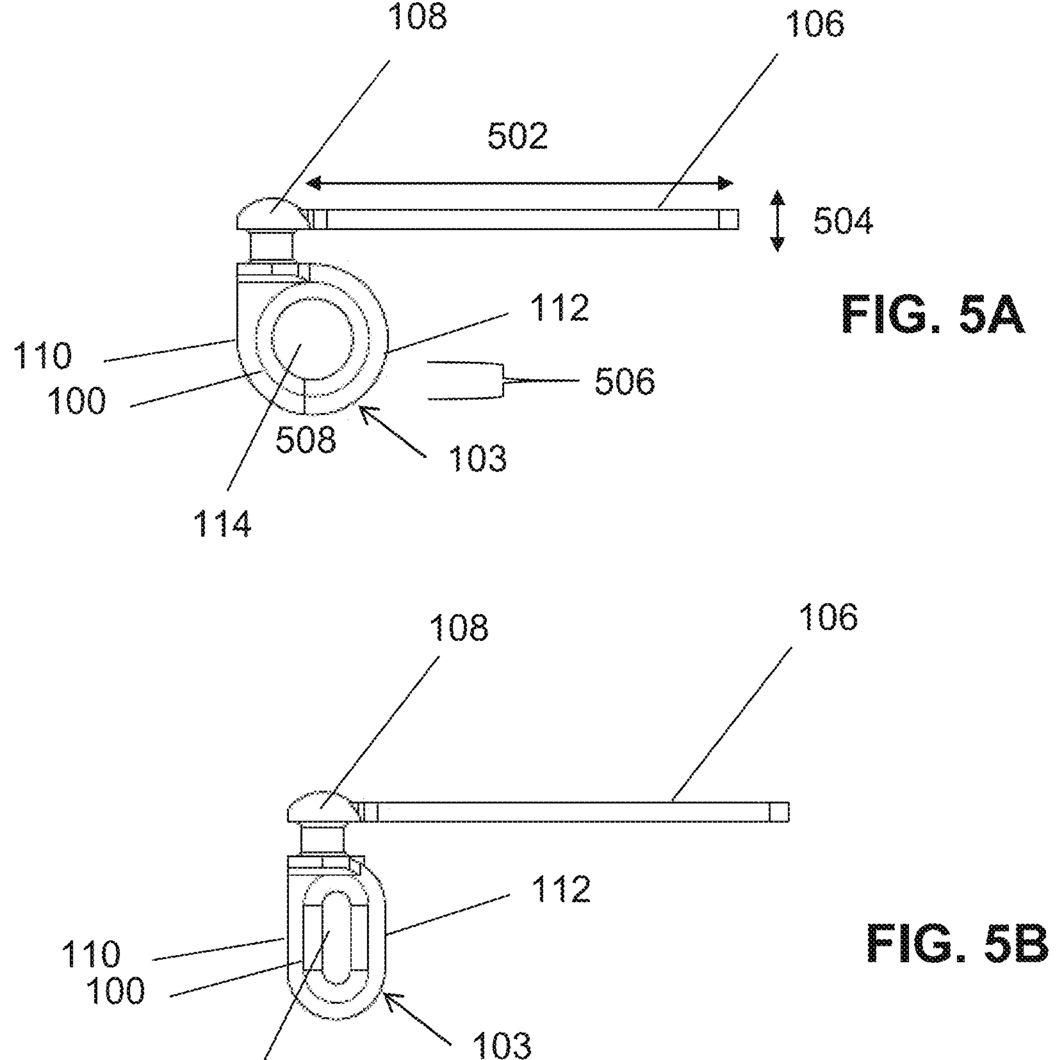
FIGS. 5A-5D are orthogonal views of a loop and a button and a connector in accordance with an embodiment of the current invention.
Figure 5C:
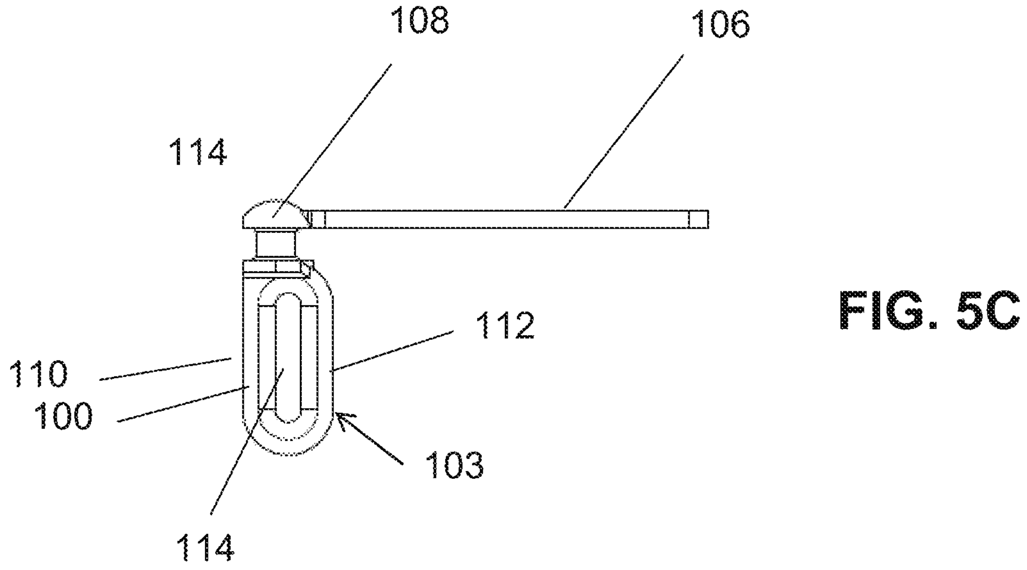
Figure 5D:
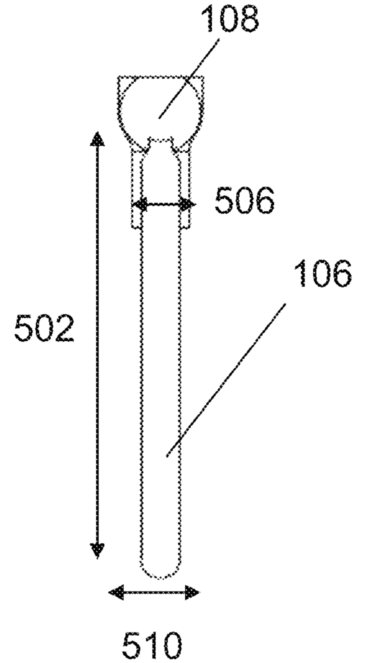

FIGS. 5A-5D are of schematic diagram illustrating various views in accordance with an embodiment of the current invention. FIGS. 5A-5C are side views of schematic diagrams of some embodiments of the current invention. FIG. 5D is a top view of a schematic diagram of some embodiments of the current invention. A handle may have a length 502 between about 0 mm to 10 mm long, and/or between about 10 mm to 20 mm long, and/or between about 20 mm to 50 mm long. Optionally, the method may also be used for larger items for example the handle may be between about 20 mm to 10 cm and/or between 10 cm to 1 meter long etc. Optionally, the handle may have a thickness 504 of between about 0 to 1 mm, and/or between about 1 mm to 3 mm, and/or between about 3 mm to 1 cm, and/or between about 1 cm to 5 cm, and/or between about 5 cm to 25 cm, etc. Optionally, the handle may have a width 510 of between about 0 to 1 mm, and/or between about 1 mm to 3 mm, and/or between about 3 mm to 1 cm, and/or between about 1 cm to 5 cm and/or between about 5 cm to 25 cm, etc. Optionally, the band may have a thickness 506 of between about 0 to 1 mm, and/or between about 1 mm to 3 mm, and/or between about 3 mm to 1 cm, and/or between about 1 cm to 5 cm, and/or between about 5 cm to 25 cm, etc. Optionally, the band may have a width 508 of between about 0 to 1 mm, and/or between about 1 mm to 3 mm, and/or between about 3 mm to 1 cm, and/or between about 1 cm to 5 cm, and/or between about 5 cm to 25 cm, etc.

Figure 6A:
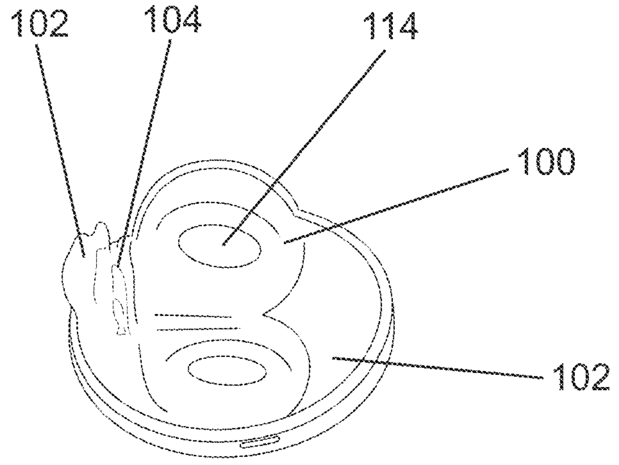
FIGS. 6A and 6B are exemplary images of a connection system in accordance with an embodiment of the current invention.
Figure 6B:
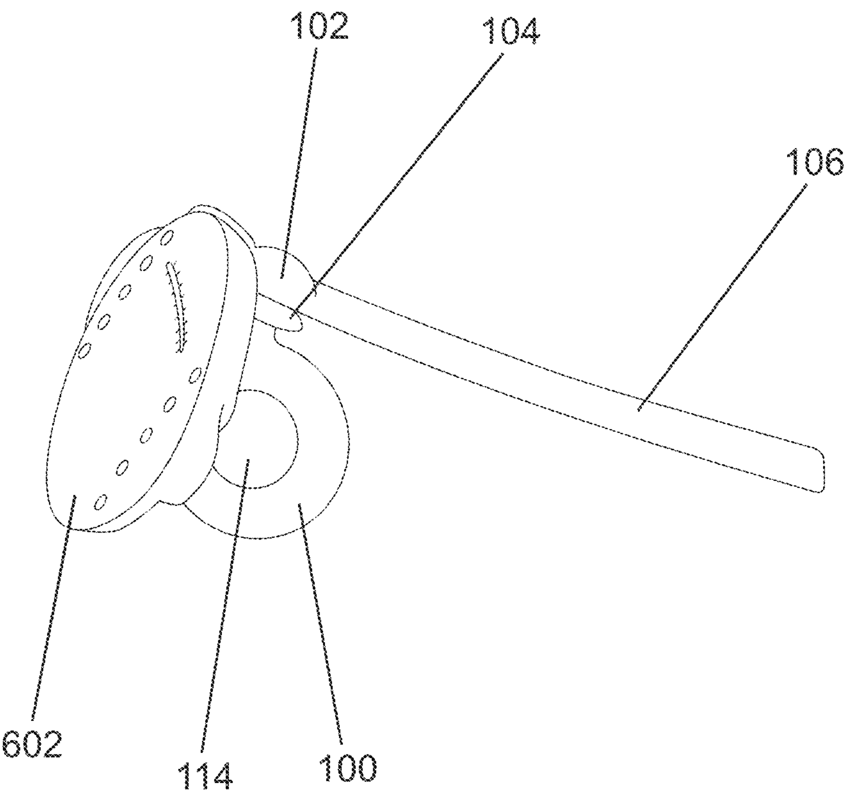

FIGS. 6A and 6B are exemplary images in accordance with an embodiment of the current invention. For example, the band 103 comprising an opening 114 and a button 108 and a handle 106 may be made from an elastic material or a flexible or semi-flexible plastic. Optionally, the band and/or handle and/or button connector may be made of various material, for example, plastic, elastic, rubber, metal, paper and/or other. Optionally, the ornament 602 may comprise a mount 104 made of a rigid, flexible or semi-flexible material. Optionally, the ornament 602 may comprise a mount 104 made from metal. Optionally, the ornament 602 may come in multiple colors, shapes, sizes, decorations, e.g., may contain a jewel, etc. For example, pulling the handle 106 through the mount opening 104 may distort the shape of the flexible button 108 and or the neck 116 and allow it to pass through the rigid mount 104, whereafter the button 108 may regain its previous shape.

Figure 7:
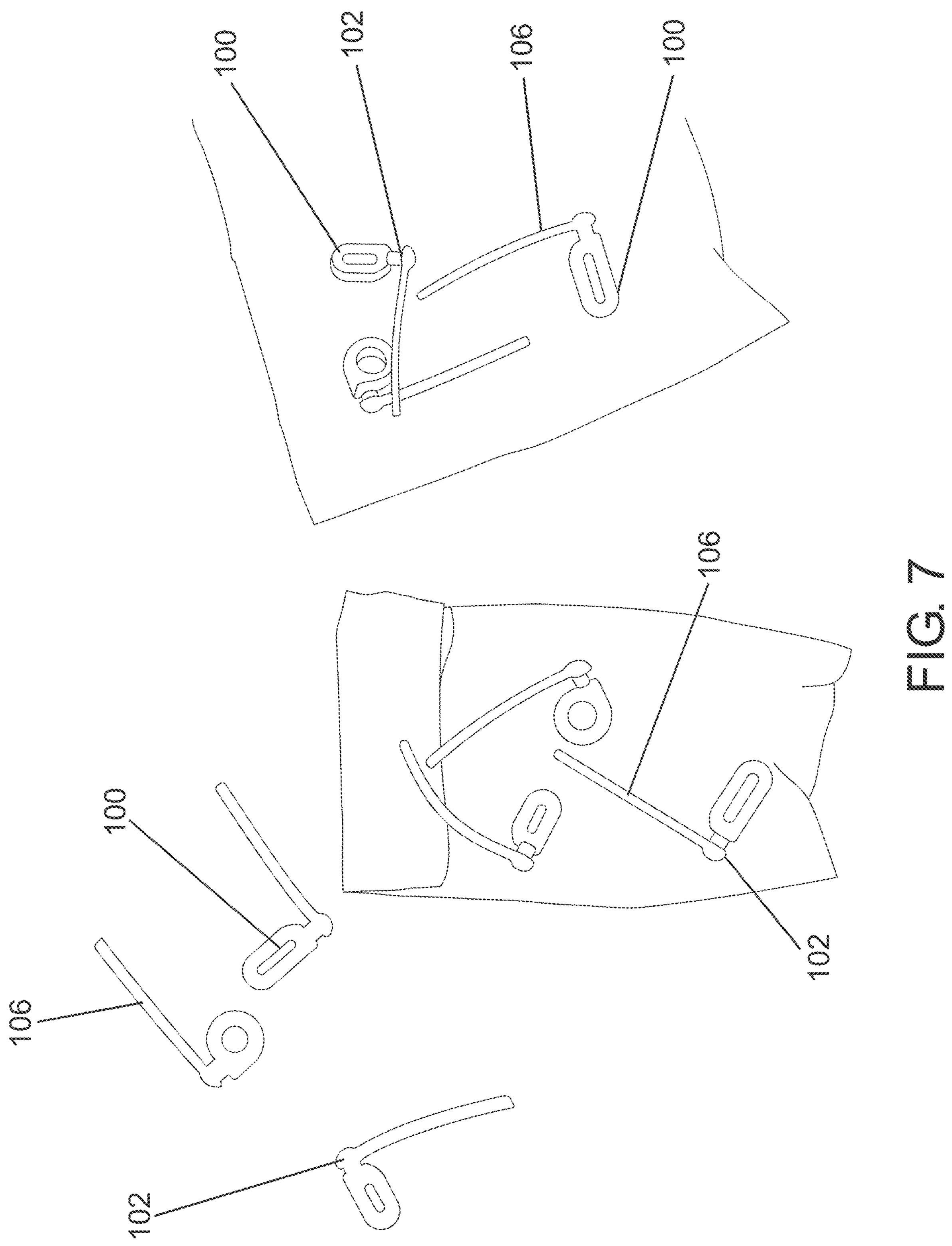
FIG. 7 is an exemplary image of connection systems in accordance with an embodiment of the current invention.

FIG. 7 is an exemplary image in accordance with an embodiment of the current invention. For example, the bands may come as a kit consisting of various different sizes of bands. Optionally, the bands may be of various colors. Optionally, various methods may be used to remove the handle, e.g., tearing, twisting, pulling, cutting, etc.

General

It is expected that during the life of a patent maturing from this application many relevant building technologies, artificial intelligence methodologies, computer user interfaces, image capture devices will be developed and the scope of the terms for design elements, analysis routines, user devices is intended to include all such new technologies a priori.

As used herein the term "about" refers to +10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for attaching two objects comprising:
a first object comprising a button type connector;
a handle attached to a button type connector;
a second object comprising a mount for said button type connector, said mount having an opening for connecting the mount to said button type connector by inserting said button type connector therethrough and inhibiting disconnection between said button type connector and said mount by inhibiting said button type connector from passing back out therethrough and wherein said handle is configured for facilitating said inserting said button type connector through said opening by pulling said handle; and
a detachable connector located between said button type connector and said handle.

2. The system of claim 1, wherein said handle is thinner than said button type connector and therefore passes more easily through said opening than said button type connector.

3. The system of claim 1, further comprising:
a biasing mechanism for biasing the button type connector to a preferred rotational orientation within the mount.

4. The system of claim 3, wherein the biasing mechanism includes a matching surface between the first object and the second object.

5. The system according to claim 1, wherein the handle is removable or detachable from the button type connector.

6. The system according to claim 1, wherein said detachable connector is a tear connector.

7. The system according to claim 1, wherein the handle has a length between about 10 to 50 mm long.

8. The system according to claim 1, wherein the first object includes a band having a diameter of between about 3 to 8 mm wide, between about 4 to 9 mm wide, or between about 5 to 12 mm wide.

9. The system according to claim 1, wherein the first object has at least one flat side.

10. The system according to claim 1, wherein the button type connector has at least one flat side.

11. The system according to claim 1, wherein the first object is rotated with respect to the second object to a preferred orientation.

12. The system according to claim 1, wherein a third object is connected to said system through the first object.

* * * * *